United States Patent Office 3,741,832
Patented June 26, 1973

3,741,832
LIQUID OXIDIZERS CONTAINING NF₂ GROUPS THICKENED WITH POLYMERIC COMPOUNDS
Lawrence Spenadel, Fanwood, and John P. Longwell, Westfield, N.J., assignors to Esso Research and Engineering Company
No Drawing. Filed Feb. 28, 1963, Ser. No. 262,294
Int. Cl. C06d 5/08
U.S. Cl. 149—109                                    6 Claims This invention relates to a method of controlling the burning of highly energetic liquid oxidizers containing NF₂ groups by adding polymeric compounds which dissolve in these liquids and form liquid solutions therewith of increased viscosity.

The highly energetic liquid compounds containing NF₂ groups linked to carbon atoms are generally sensitive materials, with respect to their combustion characteristics. Some of them, particularly the low boiling compounds, have a high sensitvity to impact and detonate or deflagrate instead of burning at a controlled rate. These characteristics have raised problems about their use in propellants in which it is desirable to have a controlled burning rate at both low and high pressures. It is desirable to prevent explosion or detonation during burning and it is important to avoid detonation in the handling of the liquid oxidizers when they are used in making up solid propellant formulations.

The highly energetic NF₂-containing compounds are, in general, typified by NF₂-substituted alkanes, NF₂-substituted cycloalkanes, NF₂-substituted dialkyl ethers, and NF₂-substituted epoxy alkanes, which have from 2 to 10 carbon atoms per molecule. These compounds with a high NF₂/carbon ratio of about 1 or higher are the more sensitive and more easily detonated compounds. Included in this group are 1,2-bis(difluoramino) ethane, 1,1,2-tris (difluoroamino) ethane, 1,2,3-tris(difluoramino) propane, 1,2,3,4-tetrakis(difluoramino) butane, 1,2,3,4-tetrakis(difluoramino) 1,4-epoxy butane, tetrakis(difluoramino) diethyl ether, hexakis(difluoramino) dipropyl ether, and similarly the higher homologs of such compounds. These compounds, in general, have at least 1 NF₂ group attached to each carbon atom, as shown in the following formulas:

tetrakis(NF₂) butane

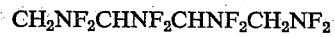

tetrakis(NF₂) diethyl ether

hexakis(NF₂) propyl ether

These compounds are referred to as liquid CNF₂ oxidizers. They have been mainly of interest as components of solid propellant formulations with a solid oxygen oxidizer, a powdered metal-containing fuel and a binder polymer which can be cured, such as polyurethanes and polyacrylates, the binders preferably being polymers which also contain energy groups, such as NF₂ groups.

In accordance with the present invention, it has been found that the highly energetic CNF₂ liquids can be thickened to liquids of higher viscosity by certain high molecular weight solid polymers being dissolved in these liquids in a relatively small proportion, and the resulting thickened liquid solution is less sensitive and gives a more stable burning. The polymers found most suitable for their effectiveness in thickening the CNF₂ liquids are the polybutadiene-NF₂ adducts which contain from 1 to 2 NF₂ groups attached to the carbon atoms in the polybutadiene recurring unit, and moderately polar polymers such as polymethacrylate. The desired molecular weight for these polymers is in the range of from 5,000 to 200,000.

The polybutadiene-NF₂ adducts are formed by the addition reaction of N₂F₄ with polybutadiene in which the NF₂ group becomes attached to the carbon atoms that are joined by double bonds in the polybutadiene polymer. The compositional formula of the polybutadiene-NF₂ adducts is represented by:

[C₄H₆(NF₂)ₓ]ₙ the subscript $n$ representing the number of monomer units in the polymer molecule, e.g. in the range of 30 to 1000, and the subscript $x$ the number of NF₂ groups attached to the carbon atoms in the recurring unit, $x$ being in the range of 1 to 2. The methyl-methacrylate polymer and the relating methacrylate polymers are well known polymers of commerce.

Although smaller amounts of the methacrylate polymer may be used as a thickening agent in the CNF₂ liqiud oxidizers, e.g. 5 to 10 wt. percent based on the weight of thickened solution as compared to proportions in the range of 10 to 20 wt. percent of the polybutadiene-NF₂ adducts for equivalent effectiveness, the polybutadiene-NF₂ adduct thickening agent has the advantage of increasing the overall NF₂ content of the resulting composition and, therefore, the energy of the system.

Samples were made up of a liquid CNF₂ oxidizer, such as tetrakis(NF₂) butane, with polymeric compounds which thickened the liquid and with other compounds which failed to thicken the liquid and the viscosities of the liquid compounds were measured with a microviscometer capable of measuring the viscosity of 0.5 cc. of material having a viscosity in the range of 0.01 to 25 poises. In the microviscometer, the liquid was made to flow through a capillary having a uniform radius R, a length L, under nitrogen pressure P, and the volume V of liquid flow through the measured section of the capillary tube in 1 second was determined. These measurements were used in Poiseuille's formula:

$$\eta = \frac{\pi \Delta P \cdot R^4}{8LV}$$

In the formula, ΔP represents the difference in pressure at the ends of the capillary tube. The symbol $\eta$ is the coefficient of viscosity in poises per dyne-seconds per sq. cm. when P is in dynes per sq. cm., the measurement of V is in cm.³/sec., L and R being in centimeters.

After the viscosities of the samples were measured, the samples were burned in a window bomb for observation, the nitrogen pressure in the bomb being adjusted and a minimum pressure at which an explosion occurred being determined. It was found that a moderate increase in viscosity by the added suitable polymer increases the minimum pressure level at which an explosion occurs, as shown in the following table:

TABLE I.—RELATION OF VISCOSITY TO STABILIZED COMBUSTION OF THICKENED LIQUID $CNF_2$ OXIDIZER

| Viscosity, poises | Composition | Pressure at which materials explode, p.s.i. | $NF_2/C$ |
|---|---|---|---|
| 0.06 | TB [1] | 15–25 | 1.000 |
| 0.45 | 90% TB/10% PBA [2] | 150 | 0.870 |
| 3.9 | 82% TB/18% PBA | >2,000 | 0.783 |
| 7.0 | 90% TB/10% PMM [3] | >2,000 | 0.721 |
| 0.06 | 92% TB/8% n-hexane | 25 | 0.716 |

[1] TB-tetrakis ($NF_2$) butane.
[2] PBA-polybutadiene-$NF_2$ adduct.
[3] PMM-polymethyl-methacrylate.

As shown in the table, while the $NF_2$ content of the compositions is important, the viscosity has a dominant role in determining if a composition will detonate at a certain pressure. The pressures listed as minimum pressures at which explosions occur may also be considered as the pressures above which stable burning is not obtained. It can be seen that the composition containing 82% of the liquid oxidizer with 18% of the polybutadiene-$NF_2$ adduct having a viscosity of 3.9 poises burns without explosion at pressure as high as 2000 p.s.i., which is the maximum pressure that could be generated in the window bomb, whereas the composition containing the tetrakis($NF_2$) butane mixed with n-hexane, even though it has a lower $NF_2$ content, tends to detonate at 25 p.s.i. This indicates that the improvement in burning quality is obtained by the increase in viscosity.

The viscosities of the liquid $CNF_2$ oxidizers, per se, are low (the viscosity of water at 20° C. being 0.015 poise). The viscosities of the thickened liquid $CNF_2$ oxidizer in the range of 2 to 9 poises at 20° C. correspond to the viscosities of oils less viscous than castor oil at the same temperature.

As indicated in Table I, the level of viscosity at which a transition from controlled burning to detonation or explosion takes place is about 2 to 3 poises. At viscosities above 2 poises, controlled burning takes place at 2000 p.s.i.; and at higher viscosities up to 9 poises, the controlled burning occurs at pressures well above 2000 p.s.i. These desired levels of viscosity are obtained by dissolving a sufficient amount of polymer thickening agent in the range of 5 to 20 wt. percent of the thickened solution to make the $CNF_2$ liquid reach the desired viscosity level. The preferred thickening agents may be used separately or together, e.g. some polymethacrylate together with the polybutadiene-$NF_2$ adduct. The proportion of thickening agents required is lowered somewhat when the thickened liquid $CNF_2$ oxidizer is mixed with and absorbed in the polymer binder, e.g. polyurethane and polyacrylates containing $NF_2$ groups.

There are other important advantages in using the thickening polymers dissolved in the liquid $CNF_2$ oxidizers in making up a solid propellant of high energy value. These advantages arise from the lower binder content required, decreased separation or exudation of liquid from the solid composite grain in its preparation and after curing, and in safer handling of the liquid oxidizer.

EXAMPLES

As an example, strands of satisfactory physical properties with low binder content were made up using 12.5 wt. percent of a poly(pentadiene monoxide)-$N_2F_4$ adduct as the binder prepolymer, said polymer having been formed with modification by 10% trimethylol propane. This binder prepolymer was mixed with 47.5% tetrakis($NF_2$) butane and 40% hydrazine diperchlorate as solid oxidizer. This mixture was cured by admixing an excess of triphenyl methane triisocyanate so as to convert the polyether alcohol prepolymer to cross-linked polyurethane. Strands of this material were found to burn erratically at all pressures, with a high incidence of detonation. Evidently, the tetrakis($NF_2$) butane was present as coherent drops of liquid and when the flame front reached it, the propellant detonated. However, by thickening the tetrakis($NF_2$) butane before it was admixed, using 10 parts by weight of the polymer polymethylmethacrylate to 90 parts by weight of the tetrakis($NF_2$) butane, successful burning was obtained with the composite after curing at pressures ranging up to above 2000 p.s.i. The burning rate at 2000 p.s.i. was 3.5″ per second, the propellant composition with the thickener containing 12.5 wt. percent of the polyurethane binder, 4.75 wt. percent of the polymethylmethacrylate thickener, 42.75 wt. percent of tetrakis($NF_2$) butane and 40 wt. percent of the solid oxygen oxidizer hydrazine diperchlorate. This propellant was determined to have an Isp (specific impulse) of 282 seconds, a tensile strength of at least 50 p.s.i.

Similarly, suitable propellant formulations can be made up of about 5 to 20 wt. percent of a curable binder material containing $NF_2$ groups, 20 to 60 wt. percent of liquid $CNF_2$ oxidizer, 20 to 60 wt. percent of solid oxygen oxidizer, 0 to 10 wt. percent of powdered metal-containing fuel, with a portion of $CNF_2$ oxidizer replaced by 5 to 20 wt. percent of a polymer thickener to give the desired increase in viscosity to the liquid. Various substances can be used as the solid oxygen oxidizers, such as ammonium perchlorate, hydrazine nitroformate, hexanitroethane, hydrazine nitrate, hydrazine perchlorate, hydrazine diperchlorate, bis(trinitroethyl nitramine), and other such oxidizers.

The powdered metal-containing fuels are the metals: aluminum, beryllium, boron, lithium, and their hydrides.

Other suitable high-energy binders which are curable and which can be used in place of the polyurethanes are the acrylates, such as acrylates of poly(pentadiene monoxide)-$N_2F_4$ adduct. The high-energy binders contain in the range of about 35 to about 65 wt. percent $NF_2$.

The liquid $CNF_2$ oxidizers, upon being thickened with a sufficient amount of the mentioned thickening polymers to be within the prescribed viscosity range, are in suitable condition for mixing with solid oxidizers, the solid powdered fuels, and the curable polymers, and are indicated to be well absorbed by the polymer binders, both before and after curing.

The invention described is claimed as follows:

1. Method of improving the stability and burning characteristics of a liquid $CNF_2$ oxidizer selected from the group consisting of $NF_2$-substituted alkanes, $NF_2$-substituted cycloalkanes, $NF_2$-substituted dialkyl ethers, and $NF_2$-substituted epoxy alkanes containing from 2 to 10 carbon atoms per molecule with an $NF_2$ group linked to each carbon atom, which consists in dissolving into the liquid $CNF_2$ oxidizer a sufficient amount of a solid polymer selected from the group consisting of polymethylmethacrylate, of polybutadiene-$NF_2$ adduct which contains from 1 to 2 $NF_2$ group per monomeric unit, and mixtures thereof to give the resulting solution of the liquid oxidizer a viscosity in the range of 2 to 9 poises at 20° C.

2. The method as set forth in claim 1, in which the liquid $CNF_2$ oxidizer is tetrakis($NF_2$) butane and the thickening agent dissolved therein is polymethylmethacrylate in an amount of 5 to 10 wt. percent of the resulting solution.

3. The method of claim 1, in which the $CNF_2$ liquid oxidizer is tetrakis($NF_2$) butane and the thickening polymer is polybutadiene-$NF_2$ adduct having the composition:

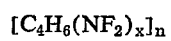

in which $x$ is in the range of 1 to 2 and $n$ is in the range of about 30 to 1,000, said polymer having a molecular weight in the range of 5,000 to 200,000 and being contained in the resulting solution in a proportion of about 10 to 20 wt. percent.

4. The method as described in claim 1, in which a mixture of polymethylmethacrylate and polybutadiene-$NF_2$ adduct is used as thickening agent.

5. A thickened $CNF_2$ liquid oxidizer of controlled burning characteristics under pressures ranging up to 2000 p.s.i., which consists essentially of a liquid oxidizer selected from the group consisting of $NF_2$-substituted alkanes, $NF_2$-substituted cycloalkanes, $NF_2$-substituted dialkyl ethers, and $NF_2$-substituted epoxy alkanes which contain 2 to 10 carbon atoms per molecule and an $NF_2$ group linked to each carbon, and mixtures thereof, with a dissolved amount of a thickening polymer selected from the group consisting of polymethylmethacrylate, polybutadiene-$NF_2$ adduct, and mixtures thereof, in an amount to give the resulting solution a viscosity in the range of 2 to 9 poises at 20° C.

6. A composition as defined in claim 5, in which the liquid oxidizer is tetrakis($NF_2$) butane.

References Cited
UNITED STATES PATENTS

| | | | |
|---|---|---|---|
| 3,551,496 | 12/1970 | Passannante et al. | 260—583 |
| 3,579,393 | 5/1971 | Allan | 149—74 |
| 3,582,413 | 6/1971 | Allan et al. | 149—109 |

BENJAMIN R. PADGETT, Primary Examiner

U.S. Cl. X.R.

149—36